3,496,469
Patented Feb. 17, 1970

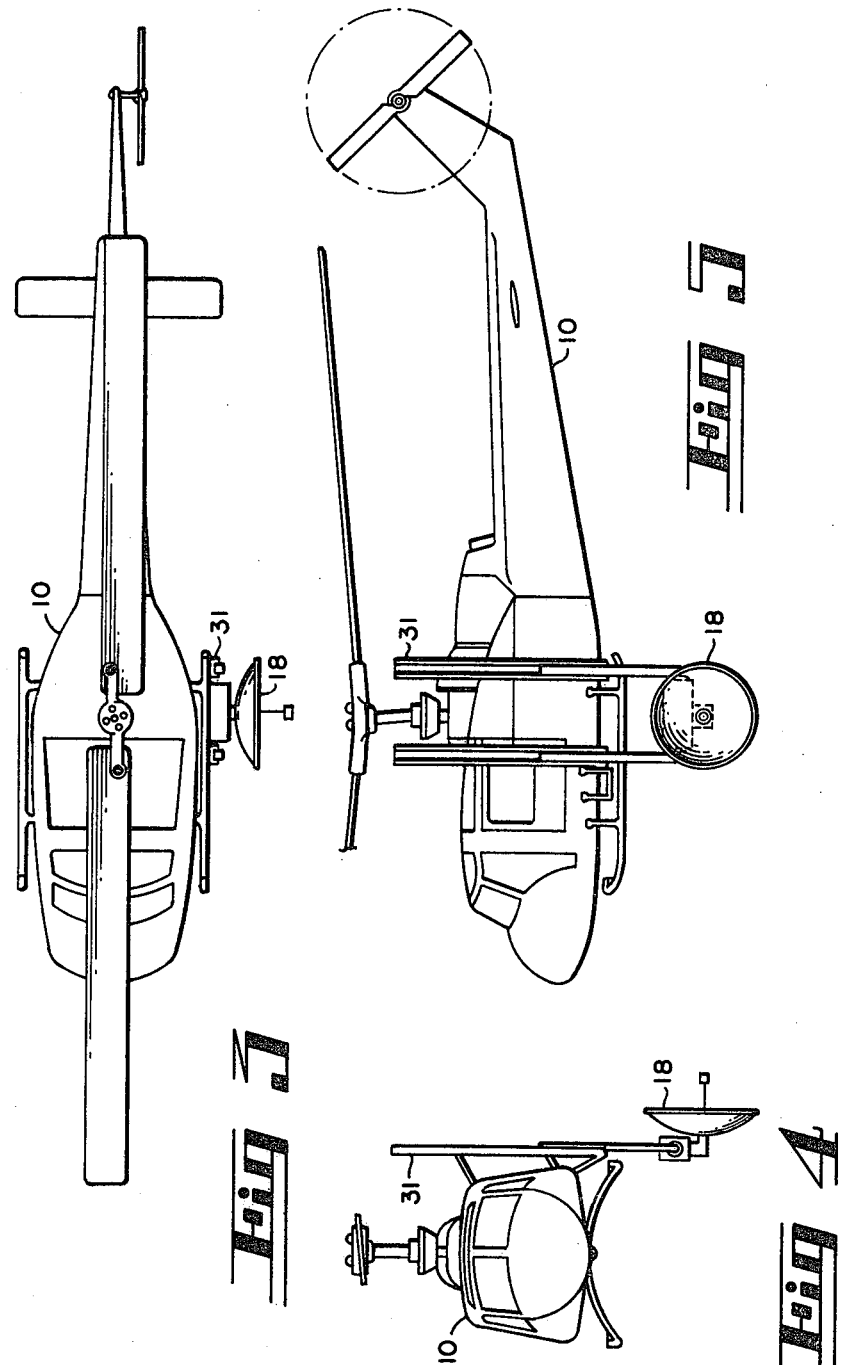

3,496,469
SYSTEM AND METHOD FOR MEASUREMENT OF PATH LOSSES IN MICROWAVE RELAY SURVEYING
Harold J. Ebbs-Canavan, Montreal, Quebec, Canada, Richard M. Chandler, Cincinnati, Ohio, and Jack M. Fleming, Toronto, Ontario, Canada, assignors to Avco Corporation, Cincinnai, Ohio, a corporation of Delaware
Filed Sept. 28, 1966, Ser. No. 582,592
Int. Cl. H04b 1/72, 3/46
U.S. Cl. 325—67                                                                 2 Claims

ABSTRACT OF THE DISCLOSURE

This invention comprises means and methods for making location surveys for future land-based elevated microwave stations. Fixed potential locations of such stations are simulated by tethering airborne platforms at predetermined elevations and at a predetermined distance from each other. These platforms are helicopters, each carrying a directional antenna. The directional antennas provide a test signal propagation path. The helicopters also carry radar equipment and radar signals cause the antennas to track each other, so that they simulate the antennas of a fixed microwave relay system. The losses in the test signal propagation path between those antennas are electrically measured.

---

Figure 1:
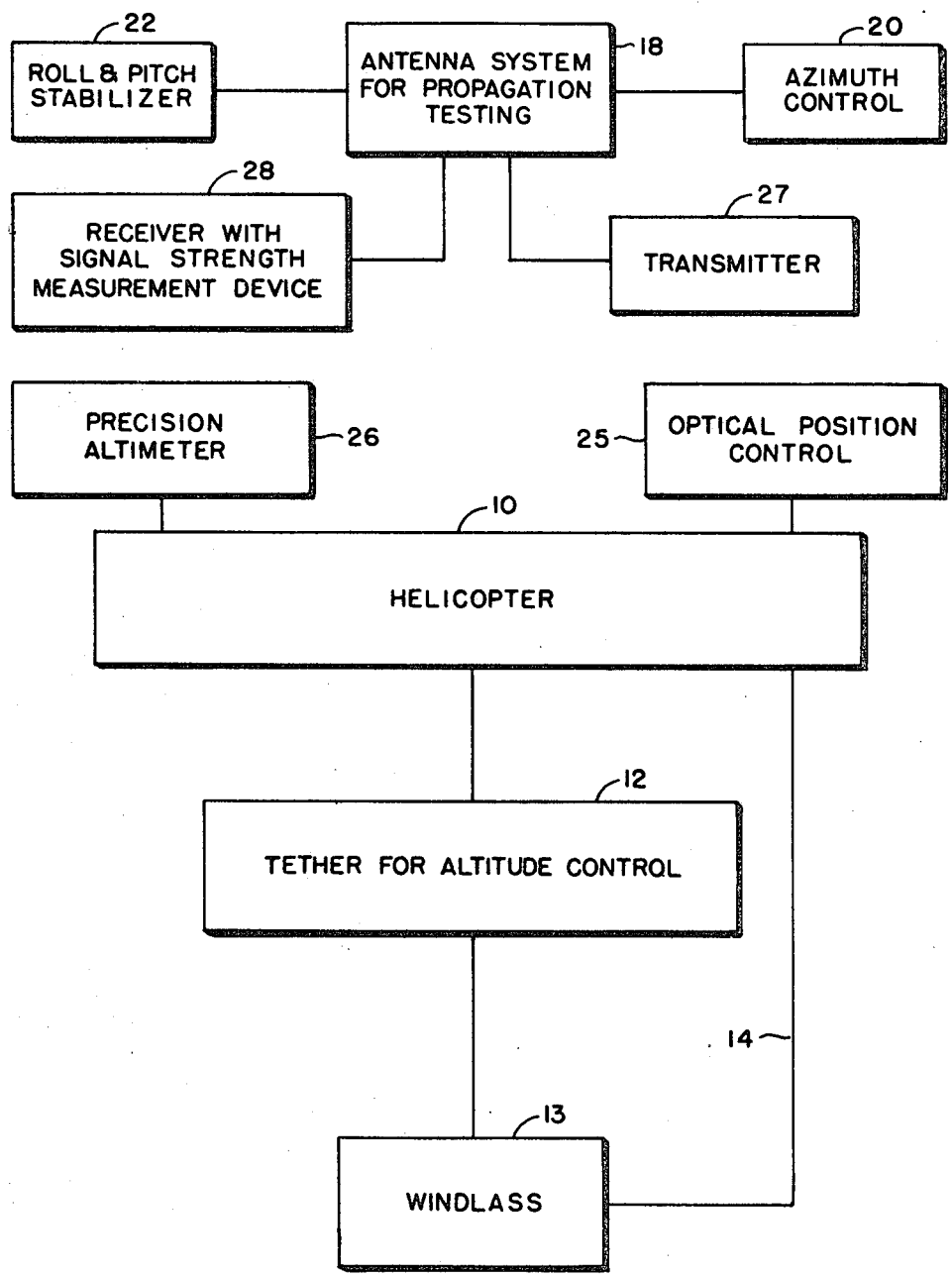

The present invention relates to microwave path testing and specifically to a novel system and method for making such tests by the use of stabilized airborne equipment.

In making surveys for the location of microwave stations such as relay stations, it is customary to make radio path loss studies in advance of the final selection of terminal sites, repeater station sites, the development of such sites and the erection of antennas. Prior art path testing is a time consuming and costly process which requires the setting up of temporary camps, the provision of access roads and trails, the installation of temporary towers and antennas and the placement of power generation equipment.

A consideration of the various steps taken in a typical prior art survey makes apparent the many complexities involved. The customary first step is to lay out on a map the desired over-all path for a microwave communications system and to plot potential antenna sites thereon. Profiles of intervening ground contour and earth curvature are then prepared for all of the various paths in the system, each potential site and every adjacent potential site being definitive of a path to be evaluated. Next, field test installations are made at each pair of adjacent sites. Each test installation consists of an antenna tower, an antenna, power generating equipment, a radio transmitter, a radio receiver and measuring and recording equipment. Site datum references are established. That is, transmitting and receiving antennas are placed, each within a fifty foot radius of its site datum reference. The two datum references involved are tentative locations for proposed towers. Now, with a transmitter height of say fifty feet, the signal strength at the receiver is recorded with a receiver antenna height of say fifty feet and this process is repeated in steps as the receiving antenna is adjusted in approximately ten foot elevational increments over a range of from 50 to 400 feet of elevation above the site datum reference which is established for the receiver antenna. Finally, data are similarly recorded with transmitter heights of 100 feet and then 150 feet and so on, a full range of recordings for each incremental increase of transmitter antenna elevation being made. It is the usual practice to make a range of recordings for transmitter antenna heights up to 400 feet.

The above requirements are quite rigorous in that the strength of received signals is generally recorded to the nearest one tenth of a decibel, and the elevation of each antenna is recorded with a tolerance of six inches. The antennas must be electrically aligned and "looking at" each other, with precision accurate to within one-half of a decibel of maximum signal condition.

The objective of the aforementioned rigorous procedures is to determine the electrical losses between the two points under consideration. An engineering evaluation analysis is then made for each station in order to determine sources of signal path obstruction and the optimum elevation for positioning the permanent station antenna in relation to its datum reference and its orientation in azimuth relative to the next adjacent station.

It being customary to locate microwave relays at a substantial elevation with respect to the surrounding terrain, sufficient access to potential sites, to permit placement of heavy equipment, is understandably difficult to achieve. The actual field engineering, i.e., the process of path loss testing per se, is brief and simple compared to the time and complexities involved in obtaining access to the site, in placing test equipment and in dismantling the test equipment and removing it to the site next chosen for evaluation.

The present invention provides a basically new system and method for performing the function of path loss measurements in surveys for microwave stations. In accordance with the principal object of the present invention there is provided a method which comprises the steps of: first establishing site datum or reference points; second, locating at predetermined elevations with respect to said reference points two spaced, self-propelled airborne platforms; third, establishing stabilized line-of-sight radio or radiant energy communication between said platforms; and fourth, measuring the electrical losses accompanying such communication.

In accordance with another basic object of the invention there is provided the combination of: a pair of hovering aircraft, means for stabilizing said aircraft in elevation with reference to fixed reference points, means for establishing stabilized line-of-sight transmission and reception between said aircraft and means for determining the electrical loss characteristics of the path between said aircraft.

Figure 2:
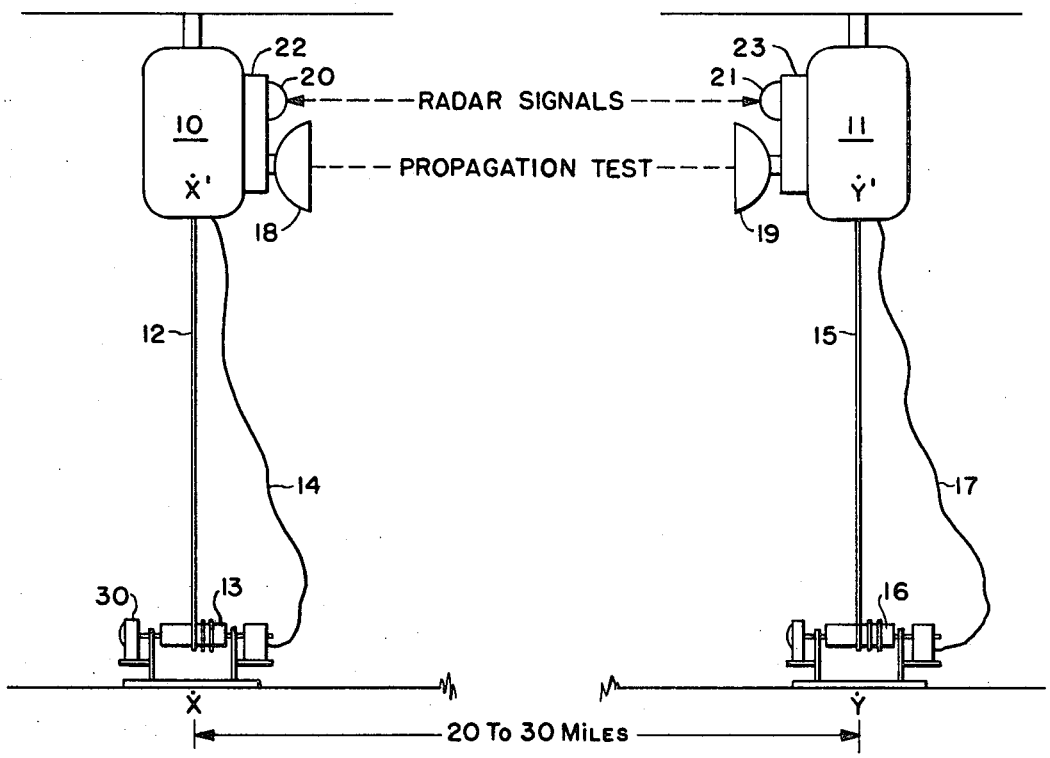

For a better understanding of the invention, together with other and further objects, advantages and capabilities thereof, reference is made to the following description of the accompanying drawings, in which:

FIG. 1 is a block diagram of a survey unit in accordance with the invention;

FIG. 2 is a skeleton outline drawing of a loss measurement system in accordance with the invention, showing a pair of spaced, self-propelled airborne electrical platforms, tether means for stabilizing the same in altitude with respect to two fixed reference points, means for establishing line-of-sight transmission and reception between said aircraft, and means for measuring the loss characteristics of the transmission path between the craft; and FIGS. 3, 4 and 5 are, respectively, top, frontal, and side elevation views of a survey or airborne testing unit in accordance with the invention.

Referring now specifically to FIG. 2, there are shown spaced reference points or site datum points X and Y which may, for example, be 20 to 30 miles apart. It is desired to measure the loss characteristics of the transmission path defined by points elevationally displaced from said points such as X' and Y', hereinafter referred to as "survey points." It will be understood that X' may be at any arbitrarily selected altitude within the range under consideration and the same is true of Y'.

In lieu of temporarily installed ground-anchored antennas positioned at two survey points, the invention provides airborne platforms or rotating wing craft, preferably helicopters, as indicated at 10 and 11. Helicopter 10 is stabilized in altitude by a tether 12 controlled by a windlass 13. The windlass may be driven by a cable 14 between the helicopter 10 and the windlass 13. Similarly, the airborne platform or helicopter 11 is stabilized by a tether 15 which is reeled out from a windlass 16 likewise controlled from the helicopter by a cable 17.

The details of a tethered aircraft per se need not be described in detail herein in that such details are shown in the following prior art United States patents: Mooers et al. 2,873,075, Shreckengost 2,995,740, Underwood 3,045,952, Wyatt 3,176,288, Petrides 3,241,145, Bartolini 3,248,735.

A conical microwave antenna 18 is carried by helicopter 10 and a similar conical microwave antenna 19 is carried by helicopter 11. Those antennas are used for the loss measurements test and the radio communication established between them will simulate the conditions with respect to frequency and modulation that are contemplated for the finalized microwave relay system installation. The communication antennas 18 and 19 are stabilized in roll and pitch by stabilizers 22 and 23 respectively. The line-of-sight communication as between the antennas 18 and 19 is established by radar tracking or azimuth control devices 20 and 21 which function as directors to control the orientation of the respective communication antennas 18 and 19 in azimuth.

From the foregoing it will be understood that the desirable components of each helicopter installation in accordance with the invention are first a helicopter 10 comprising the support vehicle for the measurement system, said helicopter being capable of maintaining its position within reasonable tolerances; second, means for stabilizing the radiator of the testing system, that is, the element 22, so that it maintains a true zenith axis; third, means such as 20 for causing the said transmit and receive antennas automatically to align in azimuth and to maintain a path for line-of-sight transmission and reception; fourth, means 12, 13, 14 for precisely maintaining a predetermined desired altitude; and fifth, required measuring and recording subsystems.

The discussion which follows relates principally to FIG. 1 and accordingly reference is made thereto. The specified ground position tolerances, that is, maintaining the helicopter 10 over target within a circle of fifty feet up to absolute elevations above ground of 400 feet, can be accomplished by use of several techniques. Elaborate and costly automatic stabilization equipment (ASE), available for nearly all helicopter types, will perform adequately, but it is considered that such equipment is not necessary in the present application. Practical operating experience has proved that pilot controlled hovering capability is more than adequate for the purpose. With elementary pilot assist devices, existing unmodified commercial helicopters are capable of supplying the required airborne helicopter for the radio test gear. Reference is made to the abovementioned Mooers et al. Patent 2,873,-075 for a prior art illustration of an automatic hovering control system for a helicopter. As indicated above, it is unnecessary to use in the system of the invention such an elaborate helicopter position-maintaining control system as is shown in the Mooers et al. patent.

Altitude control to an accuracy of inches is achieved through use of a ground attached tether 12. Secured to the tether cable, the helicopter maintains any desired tension in the cable through the application of more boost than required for free hover. The helicopter may describe a cone about the ground point, but the altitude variations will be negligible. Controlled extension of the cable length will provide controlled changes in altitude upward, while retraction of the cable accomplishes the opposite effect.

Elevation of the helicopter is controlled by means of tether 12 attached to the helicopter near its center of gravity and to an electrically driven winch 13 anchored to the ground. Electric power for driving and controlling the winch is provided from the helicopter by the cable 14 which may or may not be incorporated with the tether cable and arranged in such a manner that an operator aboard the helicopter or on the ground may control the elevation of the helicopter by increasing or reducing the tension in the tether cable through operation of the winch against the static lift of the helicopter, and so that the operator can maintain the helicopter at any particular elevation for such period as is convenient for the signal recording process. Recording of antenna elevation with respect to the time of the signal level recording is obtained by one or more of several convenient means such as a calibration of the length of the tether at the time of recording, simultaneous recording of an absolute altimeter reading, or other sound or light or radar measuring device or suitable telemetry equipment.

A precision altimeter 26 may optionally be provided to aid in maintaining the helicopter precisely at a desired altitude.

At elevations up to two hundred feet, the pilot is capable of maintaining precision position control by ordinary visual observation, but this control diminishes with increasing altitude as the ground reference becomes remote.

The pilot can be supplied with a simple optical position control instrument such as a plummet 25 (FIG. 1). Various simple sighting devices for maintaining position are per se well known to those skilled in the art.

The antenna system 18 for propagation testing is so mounted as to be stabilized by a roll and pitch stabilizer 22. That is to say, a gyro-stabilized antenna platform system in two axes, pitch ($x$-axis) and roll ($y$-axis), provides accurate readout to drive a remote servo mechanism supporting the actual antenna. The antenna is mounted external to the aircraft, to minimize interference with the signal path and minimize reflections from the rotors or other aircraft components. Stabilization capability of the antenna mount in the $x$- and $y$-axes is preferably through angles somewhat greater than the normal pitch and roll of the helicopter in the hover attitude, which are in the order of a maximum of plus or minus ten degrees in reasonable weather conditions. The $z$ or zenith axis of the antenna mount is free to rotate 360 degrees, turning on azimuth referenced to true heading, controlled by the azimuth control 20 described below.

The antenna is made partially retractable, as in the operating mode it will be below the standard landing gear of any helicopter. The particular retraction system layout will vary with the type of helicopter.

Referring again to FIG. 1 it will be understood that the antennas 18 and 19 are used for the propagation test. Each of these antennas is oriented in azimuth by its azimuth control system 20, which can, for example, be a tracking radar or other tracking device working on principles of electromagnetic radiation, either in the radio, infrared or optical spectrum. The tracking device, such as 20, is mechanically coupled to the microwave antenna 18 in such a manner as to keep it continuously aligned with the other antenna in the communications path, such as 19 (FIG. 2), thereby maintaining line-of-sight communication.

In a preferred embodiment of the invention the azimuth control device 20 is a conical scan radar. Radar 20 on one of the helicopters tracks radar 21 on the other, and vice versa. The two radar transmitters operate at different frequencies and one radar receiver is tuned to each radar transmitter. The radiator in each radar is preferably a parabolic antenna so that a radar in one helicopter looks directly at the radar in the other.

It is well within the skill of the art to use alternate azimuth control systems. For example, the communications antennas 18 and 19 could themselves be incorporated in self-oriented homing systems. The azimuth control 20 can be any means for maintaining the line-of-sight in azimuth between a transmitter and receiver in communication.

On each helicopter there are provided a transmitter such as 27 (FIG. 1) and a receiver 28. The receiver incorporates signal strength measuring equipment. Such equipment is well known to those in the art. See for example United States Patent to Seidler 2,898,453. Units 27–28 are used for testing.

The propagation loss test equipment can be any commercially available microwave transmitter, receiver, and antenna system, suitable for the purpose as to power output, carrier frequency, power requirements, weight and size. One complete set is installed in each aircraft, with the antenna mounting and platform installed on a bracket on the side of the aircraft, so arranged that it may be installed on either side of the aircraft, as convenient to the work.

As an optional feature, a measuring device 30, driven by the winch 13, records the lineal footage of tether cable as it is played out or drawn in to the winch.

Referring now to FIGS. 3, 4 and 5, the antenna such as 18 together with its mounting and roll and pitch stabilizing and azimuth control equipment is secured for slidable movement vertically with respect to a suitable rack 31, so that the entire ensemble may be lifted above the level of the landing gear of the helicopter, or lowered as desired.

While there has been shown and described what is considered to be the preferred embodiment of the invention, it will be understood by those skilled in the art that various changes and modifications may be made therein without departing from the proper scope of the invention as defined in the appended claims.

What is claimed is:

1. The method of location surveying for future land-based elevated microwave link stations which comprises the steps of
    simulating fixed potential locations in space of said stations by tethering first and second airborne platforms at predetermined elevations and at said locations,
    aiming directional antennas, one on each platform, at each other,
    stabilizing the positions of said platforms at said locations,
    controlling the positions of the antennas in azimuth so that the antennas track each other to define a substantially fixed propagation path and simulate the antennas of a fixed microwave relay system, without reliance on or support of the antennas from the ground, and
    electrically transmitting test signals from one platform to the other and electrically determining their strength at said other platform in order to measure a loss characteristic of the signal propagation path between said locations.

2. The method of location surveying for future land-based elevated microwave link stations which comprises a first series of steps consisting of
    simulating fixed potential locations in space of said stations by tethering first and second airborne platforms at predetermined elevations and at said locations,
    aiming directional antennas, one on each platform, at each other,
    stabilizing the positions of said platforms at said locations,
    controlling the positions of the antennas in azimuth so that the antennas track each other to define a substantially fixed propagation path and simulate the antennas of a fixed microwave relay system, without reliance on or support of the antennas from the ground, and
    electrically transmitting test signals from one platform to the other and electrically determining their strength in order to measure a loss characteristic of the signal propagation path between said locations,
said method further comprising
    changing the elevation of at least one of said airborne platforms, and
    a second series of steps of like character to the steps in the first series.

References Cited

UNITED STATES PATENTS

| | | | |
|---|---|---|---|
| 2,433,344 | 12/1947 | Crosby | 343—706 |
| 2,677,822 | 5/1954 | Perithou | 343—100 X |
| 2,995,740 | 8/1961 | Shreckengost | 343—705 |
| 3,030,500 | 4/1962 | Katzin | 325—56 |
| 2,627,021 | 1/1953 | Hansell et al. | 325—14 X |

OTHER REFERENCES

"Microwave Repeater Research," @ 1948 by Am. Tel & Tel Co.: Monograph B-1565, pages 1–6, relied on. (Published in Bell Sys. Tech. Journal, vol. 27, pp. 183–246, April 1948.)

Radio & Television News: July 1954, pp. 43 and 104.

Electronics: November 1955, pp. 134–136.

ROBERT L. GRIFFIN, Primary Examiner

B. V. SAFOUREK, Assistant Examiner

U.S. Cl. X.R.

235—31, 363; 343—100